(12) United States Patent
Niewiadomski et al.

(10) Patent No.: US 11,639,173 B2
(45) Date of Patent: May 2, 2023

(54) VEHICLE PLANNED PATH SIGNAL

(71) Applicant: Ford Global Technologies, LLC, Dearborn, MI (US)

(72) Inventors: Luke Niewiadomski, Dearborn, MI (US); Li Xu, Northville, MI (US); Thomas Edward Pilutti, Ann Arbor, MI (US); Hamid M. Golgiri, Westland, MI (US); Jens Kotte, Geilenkirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 16/801,212

(22) Filed: Feb. 26, 2020

(65) Prior Publication Data

US 2021/0261124 A1    Aug. 26, 2021

(51) Int. Cl.
| | |
|---|---|
| *B60W 30/095* | (2012.01) |
| *B60W 50/00* | (2006.01) |
| *B60W 30/06* | (2006.01) |
| *B60Q 5/00* | (2006.01) |
| *B60Q 1/50* | (2006.01) |
| *B60W 30/09* | (2012.01) |
| *B60Q 1/34* | (2006.01) |

(52) U.S. Cl.
CPC ........... *B60W 30/0956* (2013.01); *B60Q 1/50* (2013.01); *B60Q 5/006* (2013.01); *B60W 30/06* (2013.01); *B60W 30/09* (2013.01); *B60W 50/0097* (2013.01); *B60Q 1/346* (2013.01); *B60W 2050/0075* (2013.01); *B60W 2520/10* (2013.01); *B60W 2554/402* (2020.02); *B60W 2554/4029* (2020.02); *B60W 2554/801* (2020.02); *B60W 2554/802* (2020.02); *B60W 2556/45* (2020.02)

(58) Field of Classification Search
CPC ..... B60W 30/0956; B60W 2050/0077; B60W 30/06; B60Q 1/50; B60Q 5/006
See application file for complete search history.

(56) References Cited

U.S. PATENT DOCUMENTS

| | | | |
|---|---|---|---|
| 9,248,834 B1* | 2/2016 | Ferguson | B60W 60/0027 |
| 9,333,908 B2 | 5/2016 | Cunningham, III et al. | |
| 9,581,997 B1* | 2/2017 | Penilla | B60L 53/80 |
| 10,363,961 B2 | 7/2019 | Nordbruch | |
| 2012/0323474 A1* | 12/2012 | Breed | G08G 1/161 701/117 |
| 2016/0280236 A1* | 9/2016 | Otsuka | B60W 10/20 |
| 2017/0210386 A1* | 7/2017 | Kou | B60W 30/02 |
| 2018/0345955 A1* | 12/2018 | Kim | B60R 1/00 |
| 2019/0161080 A1* | 5/2019 | Gochev | G08G 1/127 |

(Continued)

FOREIGN PATENT DOCUMENTS

| | | |
|---|---|---|
| DE | 102014220303 A1 | 4/2016 |
| FR | 3037911 A1 | 6/2016 |

*Primary Examiner* — Dale W Hilgendorf
*Assistant Examiner* — Toya Pettiegrew
(74) *Attorney, Agent, or Firm* — Frank A. MacKenzie; Bejin Bieneman PLC

(57) ABSTRACT

A future location of a movable object is predicted to intersect a planned path of a host vehicle. A host vehicle component is actuated to output a signal indicating to move the movable object. Then, at least one of the movable object is determined to have moved or the planned path of the host vehicle is updated. Then, the host vehicle is operated along the planned path or the updated planned path.

17 Claims, 7 Drawing Sheets

(56) References Cited

U.S. PATENT DOCUMENTS

| | | | | |
|---|---|---|---|---|
| 2019/0248414 A1* | 8/2019 | Ohtani | ................... | B62D 6/001 |
| 2019/0333381 A1* | 10/2019 | Shalev-Shwartz | ..... | G06V 20/56 |
| 2020/0269832 A1* | 8/2020 | Kwon | ................... | B60W 30/06 |
| 2020/0328800 A1* | 10/2020 | Suzuki | ................. | H04W 48/20 |

* cited by examiner

VEHICLE PLANNED PATH SIGNAL

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
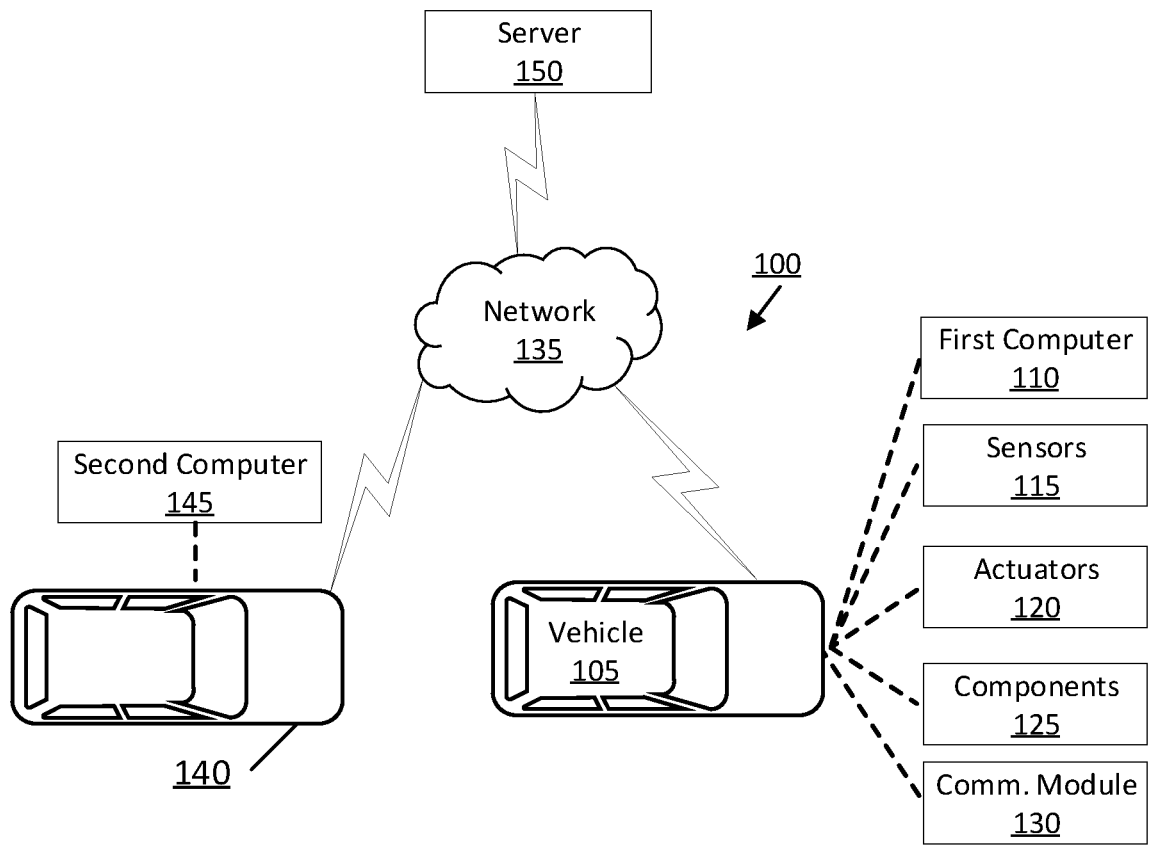
FIG. 1 is a block diagram illustrating an example vehicle control system for a host vehicle.

A system includes a first computer including a processor and a memory, the memory storing instructions executable by the processor to predict that a future location of a movable object and a planned path of a host vehicle will intersect. The instructions further include instructions to actuate a host vehicle component to output a signal indicating to move the movable object. The instructions further include instructions to then, at least one of (a) determine that the movable object has moved, or (b) update the planned path of the host vehicle. The instructions further include instructions to then, operate the host vehicle along the planned path or the updated planned path.

The first computer may be included on the host vehicle. The system may further include a second computer on the movable object, the second computer including a second processor and a second memory, the second memory storing instructions executable by the second processor to predict that the host vehicle will move along the planned path. The instructions may further include then, at least one of (a) determine that the host vehicle has moved along the updated path or (b) update the future location of the movable object. The instructions may further include then, operate the movable object to the future location or the updated future location.

The instructions can further include instructions to determine the future location of the movable object is in a travel route based on at least one of sensor data and location data.

The instructions can further include instructions to determine the updated future location will avoid intersecting the planned path.

The instructions can further include instructions to determine the updated future location based on a distance from the future location to the updated future location being within a specified distance.

The movable object can be a vehicle.

The instructions can further include instructions to operate the movable object to a parking space based on moving the movable object to a threshold number of updated future locations.

The host vehicle component can be at least one of a horn, exterior lights, and a propulsion component.

The instructions can further include instructions to actuate the propulsion component to operate the host vehicle along a portion of the planned path based on a distance between the host vehicle and the movable object.

The instructions can further include instructions to input host vehicle sensor data into a machine learning program that identifies the movable object.

The future location can be defined in part by a path of the movable object.

The instructions can further include instructions to determine the host vehicle is within a distance threshold of the movable object.

The instructions can further include instructions to determine at least one of the movable object and the host vehicle is moving at a speed below a speed threshold.

The instructions can further include instructions to, upon identifying a parking space for the host vehicle, actuate a turn signal of the host vehicle.

The instructions can further include instructions to, upon determining a planned path into a parking space, perform a parking maneuver along the planned path.

The movable object can be one of a vehicle or a pedestrian.

A method includes predicting that a future location of a movable object and a planned path of a host vehicle will intersect. The method further includes actuating a host vehicle component to output a signal indicating to move the movable object. The method further includes then, at least one of (a) determining that the movable object has moved, or (b) updating the planned path of the host vehicle. The method further includes then, operating the host vehicle along the planned path or the updated planned path.

The method can further include predicting that the host vehicle will move along the planned path. The method can further include then, at least one of (a) determining that the host vehicle has moved along the updated path or (b) updating the future location of the movable object. The method can further include then, operating the movable object to the future location or the updated future location.

The future location can be defined in part by a path of the movable object.

The movable object can be one of a vehicle or a pedestrian.

Further disclosed herein is a computing device programmed to execute any of the above method steps. Yet further disclosed herein is a computer program product, including a computer readable medium storing instructions executable by a computer processor, to execute an of the above method steps.

With initial reference to FIGS. 1-3C, an example vehicle control system 100 includes a first computer 110 that is programmed to predict that a future location of a movable object 140 and a planned path P of a host vehicle 105 will intersect. The first computer 110 is further programmed to actuate a host vehicle component 125 to output a signal indicating to move the movable object 140. The first computer 110 is further programmed to then at least one of (a) determine that the movable object 140 has moved or (b) update the planned path P of the host vehicle 105. The first computer 110 is further programmed to then operate the host vehicle 105 along the planned path P or the updated planned path P.

The first computer 110 operates a host vehicle 105 along a planned path P in an area 200. Typically, the host vehicle 105 changes a direction of travel, i.e., turns/and or changes from forward to reverse, while operating along the planned path P to, e.g., perform a parking maneuver, search for available parking spaces, etc. However, a movable object 140 may be unable to predict or determine a change of direction along the planned path P of the host vehicle 105, increasing a risk that the movable object 140 will intersect the planned path P of the host vehicle 105. Advantageously, the first computer 110 can actuate one or more vehicle components 125 to output a signal to move the movable object 140, which alerts the movable object 140 to the planned path P of the host vehicle 105. The signal indicates the movable object 140 is obstructing the planned path P of the host vehicle 105, which can prompt the movable object 140 to move away from the planned path P.

Turning now to FIG. 1, the host vehicle 105 includes the first computer 110, sensors 115, actuators 120 to actuate various host vehicle components 125, and a vehicle communications module 130. The communications module 130 allows the first computer 110 to communicate with a server 150 and/or the second vehicle 106, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The first computer 110 includes a processor and a memory such as are known. The memory includes one or more forms of computer-readable media, and stores instructions executable by the first computer 110 for performing various operations, including as disclosed herein.

The first computer 110 may operate the host vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the first computer 110; in a semi-autonomous mode the first computer 110 controls one or two of vehicle 105 propulsion, braking, and steering; in a non-autonomous mode a human operator controls each of vehicle 105 propulsion, braking, and steering.

The first computer 110 may include programming to operate one or more of host vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the first computer 110, as opposed to a human operator, is to control such operations.

The first computer 110 may include or be communicatively coupled to, e.g., via a vehicle communications network such as a communications bus as described further below, more than one processor, e.g., included in electronic controller units (ECUs) or the like included in the host vehicle 105 for monitoring and/or controlling various host vehicle components 125, e.g., a transmission controller, a brake controller, a steering controller, etc. The first computer 110 is generally arranged for communications on a vehicle communication network that can include a bus in the host vehicle 105 such as a controller area network (CAN) or the like, and/or other wired and/or wireless mechanisms.

Via the vehicle 105 network, the first computer 110 may transmit messages to various devices in the host vehicle 105 and/or receive messages (e.g., CAN messages) from the various devices, e.g., sensors 115, an actuator 120, ECUs, etc. Alternatively, or additionally, in cases where the first computer 110 actually comprises a plurality of devices, the vehicle communication network may be used for communications between devices represented as the first computer 110 in this disclosure. Further, as mentioned below, various controllers and/or sensors 115 may provide data to the first computer 110 via the vehicle communication network.

Vehicle 105 sensors 115 may include a variety of devices such as are known to provide data to the first computer 110. For example, the sensors 115 may include Light Detection And Ranging (LIDAR) sensor(s) 115, etc., disposed on a top of the host vehicle 105, behind a vehicle 105 front windshield, around the host vehicle 105, etc., that provide relative locations, sizes, and shapes of objects surrounding the host vehicle 105. As another example, one or more radar sensors 115 fixed to vehicle 105 bumpers may provide data to provide locations of the objects, second vehicles 106, etc., relative to the location of the host vehicle 105. The sensors 115 may further alternatively or additionally, for example, include camera sensor(s) 115, e.g. front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105 and the movable object 140, as well as other items including as discussed below, fall within the definition of "object" herein.

The first computer 110 is programmed to receive data from one or more sensors 115 substantially continuously, periodically, and/or when instructed by a server 150, etc. The data may, for example, include a location of the host vehicle 105. Location data may be in a known form, e.g., geo-coordinates such as latitude and longitude coordinates obtained via a navigation system, as is known, that uses the Global Positioning System (GPS). Additionally, or alternatively, the data can include a position of an object, e.g., a vehicle, a pole, a curb, a bicycle, a tree, a shrub, etc., relative to the vehicle 105. As one example, the data may be image data of the environment around the vehicle 105. In such an example, the image data may include one or more objects in the area 200. Image data is digital image data, e.g., comprising pixels with intensity and color values, that can be acquired by camera sensors 115. The sensors 115 can be mounted to any suitable location in or on the host vehicle 105, e.g., on a vehicle 105 bumper, on a vehicle 105 roof, etc., to collect images of the environment around the host vehicle 105.

The first computer 110 can be programmed to classify and/or identify the object(s) included in the image data. For example, conventional object classification techniques can be used, e.g., in the first computer 110 based on lidar sensor 115 data, camera sensor 115 data, etc., to classify a detected object as movable or non-movable. Additionally, or alternatively, conventional object identification techniques can be used, e.g., in the first computer 110 based on lidar sensor 115 data, camera sensor 115 data, etc., to identify a type of movable object 140, e.g., a vehicle (see FIGS. 3A and 3C), a pedestrian (see FIG. 3B), a drone, etc., as well as physical features of objects.

Various techniques such as are known may be used to interpret sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input host vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the host vehicle 105 can be applied to specify locations and/or areas (e.g., according to the host vehicle 105 coordinate system, translated to global latitude and longitude geo-coordinates, etc.) of objects identified from sensor 115 data. Yet further, the first computer 110 could employ various techniques for fusing (i.e., incorporating into a common coordinate system or frame of reference) data from different sensors 115 and/or types of sensors 115, e.g., lidar, radar, and/or optical camera data.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a host vehicle 105.

In the context of the present disclosure, a vehicle component 125 is one or more hardware components adapted to perform a mechanical or electro-mechanical function or operation—such as moving the host vehicle 105, slowing or stopping the vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the first computer 110 may be configured for communicating via a vehicle-to-vehicle communication module 130 or interface with devices outside of the host vehicle 105, e.g., through a vehicle-to-vehicle (V2V) or vehicle-to-infrastructure (V2X) wireless communications (cellular and/or DSRC, etc.) to another vehicle, to a server 150 (typically via direct radio frequency communications), and/or (typically via the network 135) to a second vehicle 106. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a first computer 110 may communicate with remote computing devices, e.g., the server 150, another first computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 150 can be a conventional computing device, i.e., including one or more processors and one or more memories, programmed to provide operations such as disclosed herein. Further, the server 150 can be accessed via the network 135, e.g., the Internet or some other wide area network.

Figure 3A:
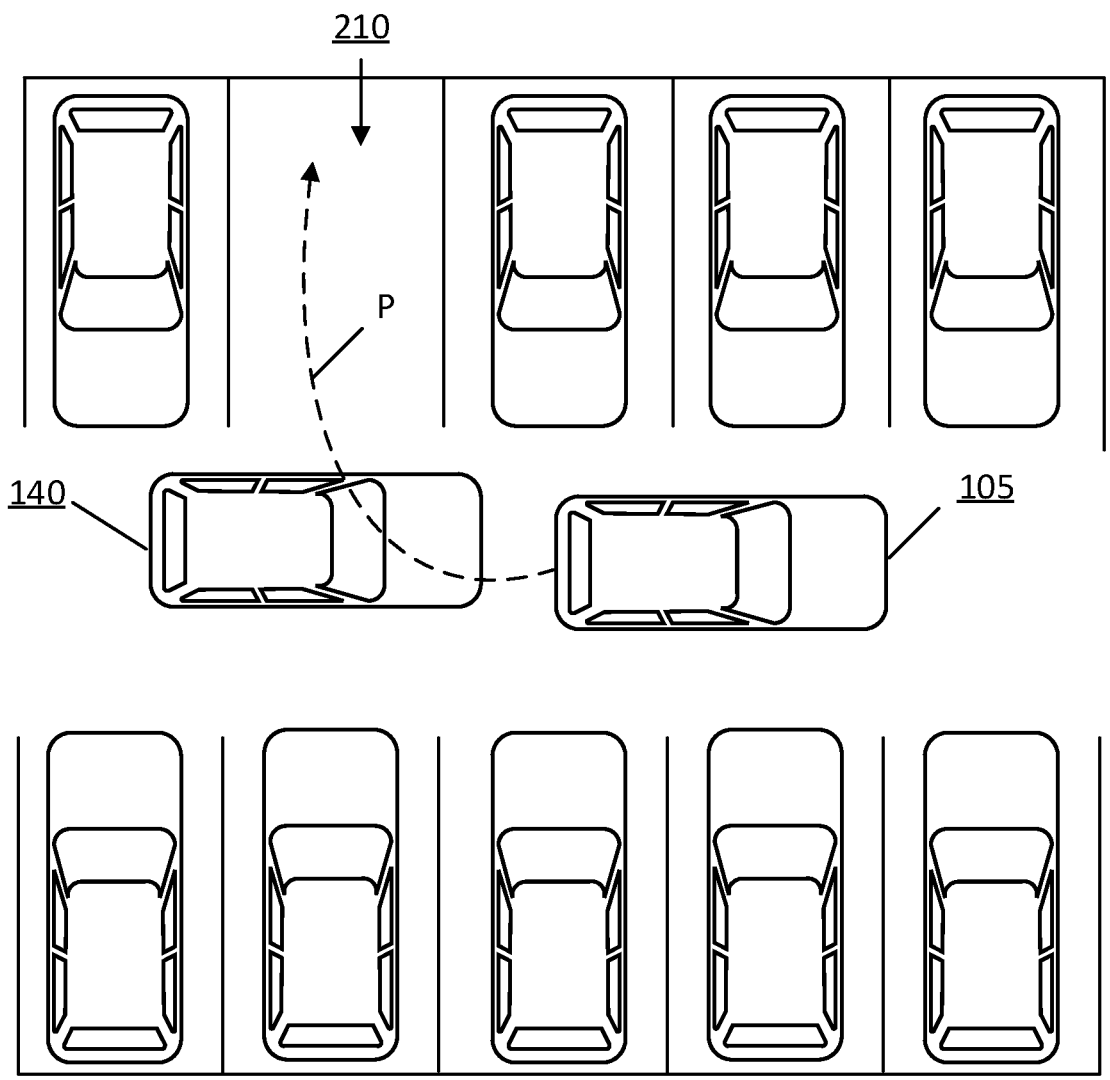
FIGS. 3A-3B are diagrams of a movable object intersecting a planned path of a host vehicle.
Figure 3B:
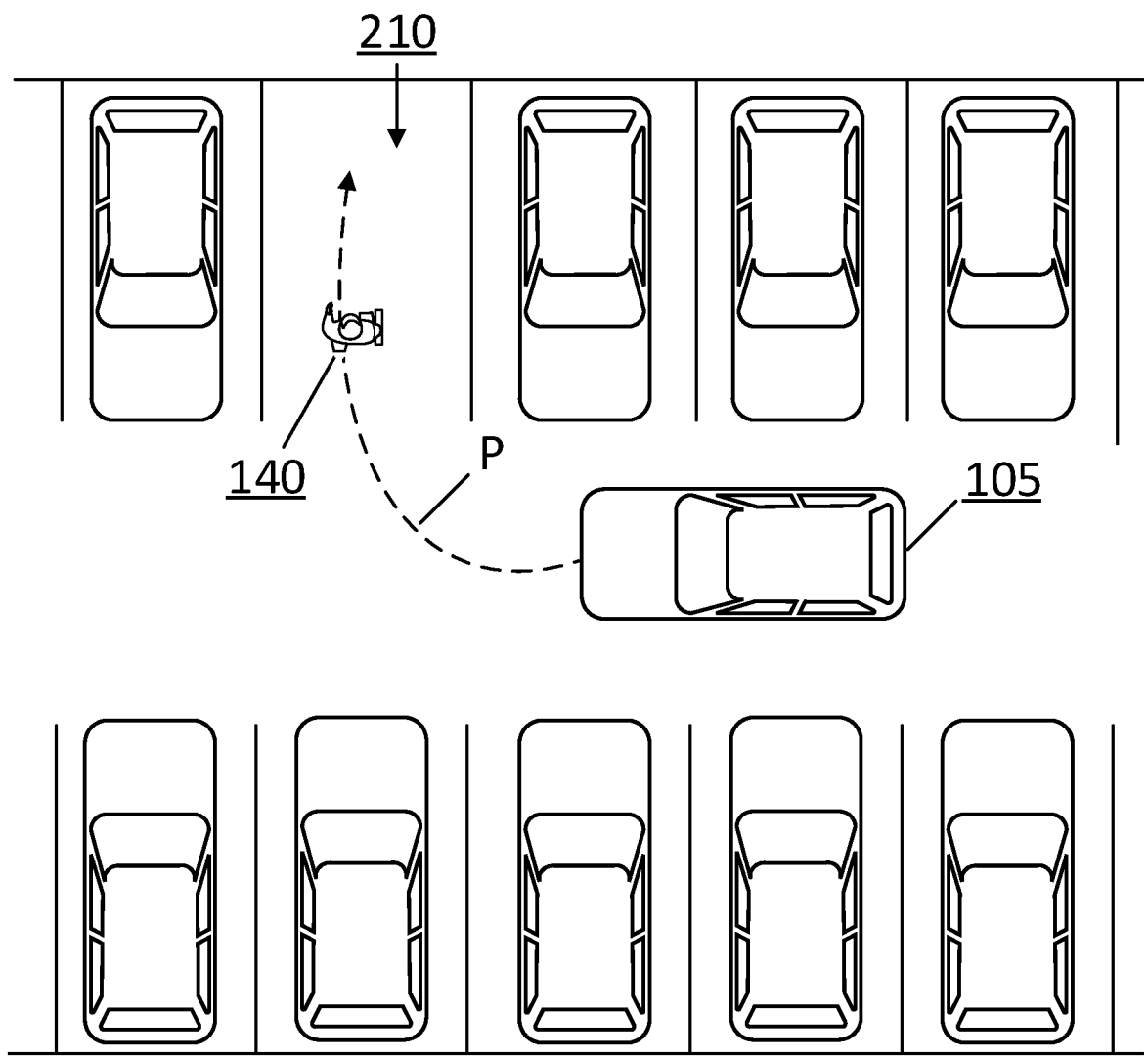
Figure 3C:
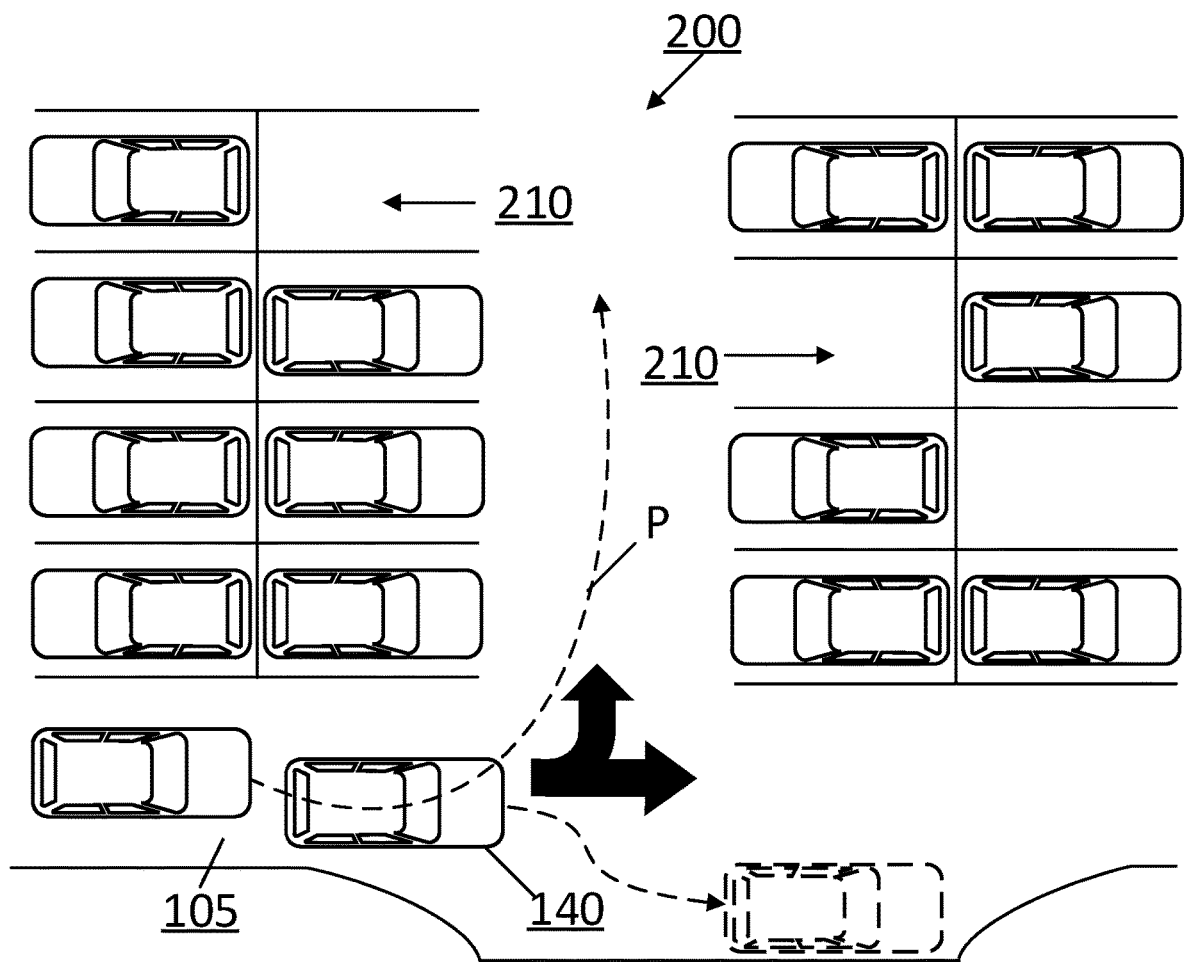
FIG. 3C is a diagram of a movable object in a travel route intersecting the planned path of the host vehicle.

As one example, the movable object 140 may be a pedestrian (see FIG. 3B). As another example, the movable object 140 may be a vehicle (see FIG. 3A). In such an example, the vehicle 140 includes a second computer 145. The second computer 145 includes a second processor and a second memory such as are known. The second memory includes one or more forms of computer-readable media, and stores instructions executable by the second computer 110 for performing various operations, including as disclosed herein.

Additionally, the vehicle 140 may include sensors, actuators to actuate various vehicle components, and a vehicle communications module. The sensors, actuators to actuate various vehicle components, and the vehicle communications module typically have features in common with the sensors 115, actuators 120 to actuate various host vehicle components 125, and the vehicle communications module 130, and therefore will not be described further to avoid redundancy.

Figure 2:
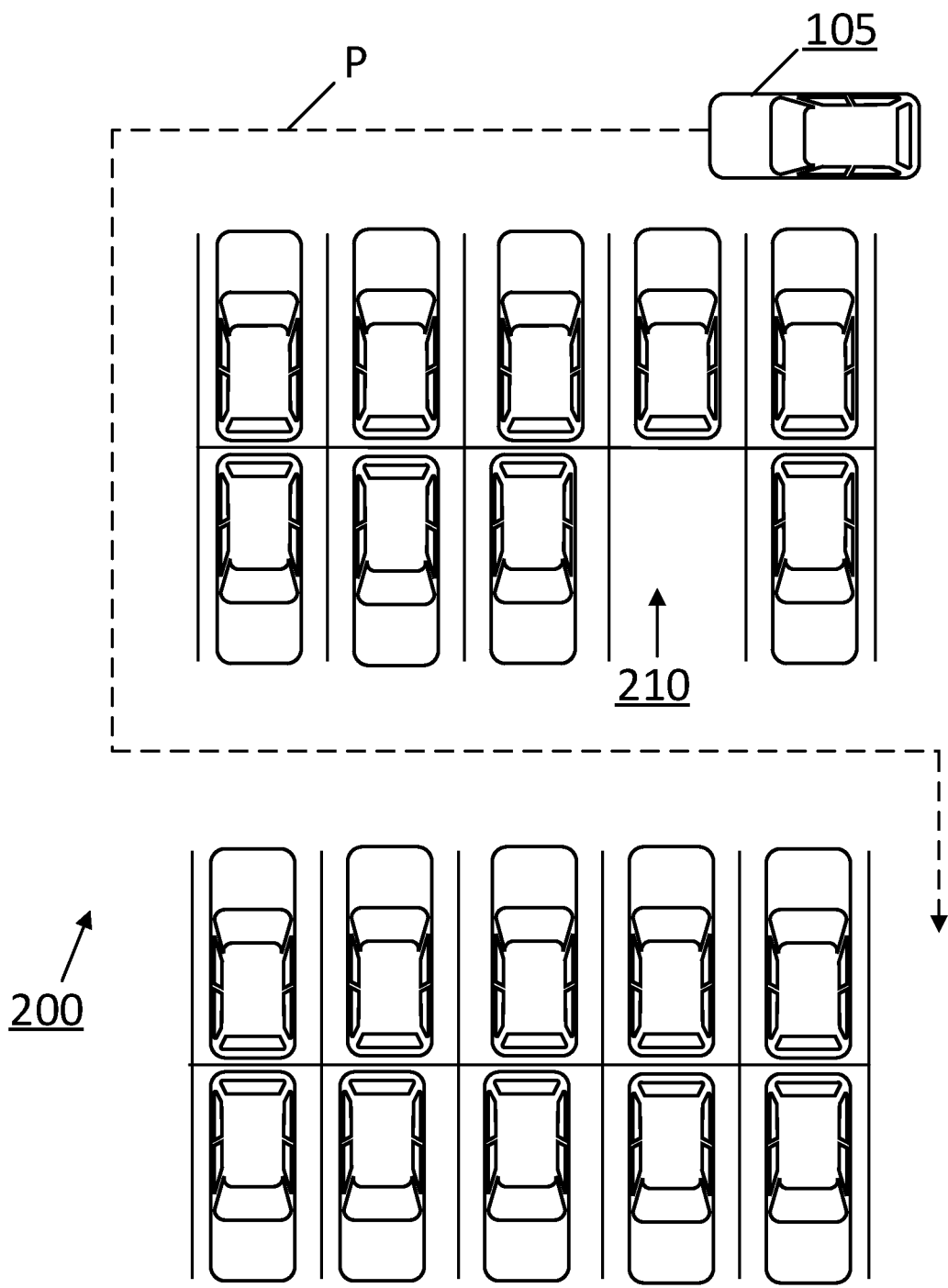
FIG. 2 is a diagram illustrating operating a host vehicle according to the system of FIG. 1.

FIG. 2 is a diagram illustrating a host vehicle 105 operating in an example ground surface area 200 that includes marked sub-areas 210 for vehicles. An area 200 may be on a street or road, e.g., alongside a curb or an edge of the street, a parking lot or structure or portion thereof, etc. The first computer 110 may be programmed to determine the host vehicle 105 is within the area 200 by, e.g., GPS-based geo-fencing. In such an example, the GPS geo-fence specifies a perimeter of the area 200. The first computer 110 can then determine the host vehicle 105 is within the area 200 based on the location data of the host vehicle 105 indicating the host vehicle 105 is within the geo-fence.

The first computer 110 can, for example, generate a planned path P to operate the host vehicle 105 in the area 200. Alternatively, the server 150 can generate the planned path P and provide the planned path P to the first computer 110, e.g., via the network 135. As used herein, a "planned path" is a set of points, e.g., that be specified as coordinates with respect to a host vehicle coordinate system and/or geo-coordinates, that the first computer 110 is programmed to determine with a conventional navigation and/or path planning algorithm. The planned plan P can, for example, direct the host vehicle 105 along each aisle along which sub-areas 210 are located in the area 200 to search for available sub-areas 210 (see FIG. 2). In such an example, the first computer 110 is programmed to identify a potentially available sub-area 210 for parking the host vehicle 105 based on image data received from camera sensors 115, e.g., via the vehicle network. For example, a sub-area 210 can be a parking space indicated by conventional markings, e.g., painted lines on a ground surface, and conventional image recognition techniques can be employed by the first computer 110 to identify the sub-area 210 and a potentially available parking space.

Upon identifying the potentially available sub-area 210, the first computer 110 can generate a planned path P for parking the host vehicle 105 in the potentially available sub-area 210 (see FIGS. 3A-3B). The first computer 110 can determine to move the host vehicle 105 forward (see FIG. 3A) or backward (see FIG. 3B) into the sub-area 210 according to the planned path P. The first computer 110 may determine forward or backward based on, e.g., a rule for positioning the vehicle 105 (e.g., a rear of the vehicle must be facing outward toward a path for vehicle travel from a parking space sub-area, or that a front of the vehicle 105 must be so facing, etc.) in the area 200. For example, one or more rules can be stored in a memory of the computer 110, received from a remote computer (not shown) via the network 135, etc., received via a user input to a vehicle 105 human machine interface such as a touchscreen, knob, button, dial, etc. The first computer 110 can then provide a signal that a planned path P of the host vehicle 105 includes moving into the sub-area 210, For example, the computer 110 can actuate a turn signal on the same side of the host vehicle 105 as the sub-area 210, e.g., to indicate that the vehicle 105 may park in the sub-area 210.

The first computer 110 may be programmed to actuate one or more host vehicle components 125 to operate the host vehicle 105 along the planned path P into the sub-area 210, e.g., perform a parking maneuver. For example, the first computer 110 can actuate one or more host vehicle components 125, e.g., a propulsion component, a steering component, etc., to move the host vehicle 105 forward into the sub-area 210 along a forward path. As another example, based on planning a backward path, the first computer 110 can be programmed to actuate one or more host vehicle components 125 to operate the host vehicle 105 to a stop position past the potentially available sub-area 210, such that the first computer 110 can move the host vehicle 105 backward into the sub-area 210. The stop position is a forward distance measured in a forward direction of travel of the host vehicle 105 from the sub-area 210, e.g., a line of the sub-area 210, to a rear of the host vehicle 105 and a lateral distance measured in a direction transverse to the forward direction from the sub-area 210, e.g., an end of the line of the sub-area 210, to a side of the host vehicle 105. The distances are stored in the memory of the first computer 110. The preset distances are chosen to be the shortest possible distances that still permit the host vehicle 105 to travel in reverse to the sub-area 210, based on a turning radius of the host vehicle 105 while traveling in reverse.

While the host vehicle 105 is performing a maneuver to move into a sub-area 210, the first computer 110 can receive sensor 115 data, e.g., image data, of the potentially available sub-area 210. The image data can include an object in the potentially available sub-area 210 that was previously occluded by other objects between the host vehicle 105 and the potentially available sub-area 210. The first computer 110 can then verify an availability of the sub-area 210 based on the sensor 115 data indicating a presence or absence of an object in the sub-area 210. For example, the first computer 110 can employ conventional image analysis or pattern recognition techniques to analyze the image data and identify a stationary, i.e., non-movable, object, e.g., a parked vehicle, a pole, a shopping cart rack, etc., in the sub-area 210. If a stationary object is in the sub-area 210, e.g., between the markings of the parking space, the first computer 110 determines that the sub-area 210 is unavailable. If a stationary object is not in the sub-area 210, e.g., between the markings of the parking space, then the first computer 110 can determine that the sub-area 210 is potentially available.

Additionally, the first computer 110 can analyze the sensor 115 data to determine access to the sub-area 210 for the host vehicle 105 is prohibited. For example, the first computer 110 can determine access is prohibited based on detecting a condition or conditions specified to prohibit access to the sub-area 210, e.g., a sign, a barrier, a marking, etc., via image data, that specifies one or more conditions, e.g., vehicle characteristics, user characteristics, time of day, special event, etc., prohibiting access the sub-area 210. The first computer 110 can identify the condition(s) prohibiting access based on comparing the detected condition(s) to conditions stored in the memory of the first computer 110. The first computer 110 can then compare the host vehicle 105 data, e.g., based on host vehicle data, such as vehicle dimensions, a type of vehicle, a vehicle identifier, vehicle user characteristics, etc., to the prohibition condition(s) to determine whether the host vehicle 105 is prohibited from accessing the sub-area 210. In the case that the host vehicle 105 is not prohibited from accessing the sub-area 210, the first computer 110 determines the sub-area 210 is available. In the case that the host vehicle 105 is prohibited from accessing the sub-area 210, the first computer 110 can determine the sub-area 210 is unavailable. If the sub-area 210 is available, the first computer 110 may operate the host vehicle 105 along the planned path P into the sub-area 210. If the sub-area 210 is unavailable, the first computer 110 updates the planned path P to search for available sub-areas 210 and actuates one or more host vehicle components to operate the host vehicle 105 along the updated path.

While operating along a planned path P, the host vehicle 105 can identify a movable object 140 as discussed above. The first computer 110 can be programmed to predict whether a future location of the movable object 140 will intersect the planned path P of the host vehicle 105. The first computer 110 can predict the future location of the movable object based on sensor 115 data. The future location of the movable object 140 is defined at least in part by a predicted path of the movable object 140. For example, the first computer 110 can predict a path of the moving object 140 based on identifying a direction of movement of the movable object 140 via sensor 115 data, e.g., sequential frames of image data. The first computer 110 can then compare the predicted path of the movable object 140 to the planned path P of the host vehicle 105.

As another example, upon determining the movable object 140 is stationary based on image data, the first computer 110 can predict whether the movable object 140 will remain stationary or move based on physical characteristics of the movable object 140. For example, when the movable object 140 is a vehicle, the first computer 110 can predict the movable object 140 will move based on detecting one or more of sound from the movable object 140 indicating the engine is running, exterior lights in an "on" state, doors in a closed position, etc. Conversely, the first computer 110 can predict the movable object 140 will remain stationary based on detecting one or more of a lack of sound from the movable object 140 indicating the engine is not running, exterior lights in an "off" state, doors in an open position, etc.

If the first computer 110 determines the movable object 140 will remain stationary, then the first computer 110 can predict that the future location will be a current location of the movable object 140. The first computer 110 can then compare the future location to the planned path P of the host vehicle 105. If the first computer 110 determines the movable object 140 will move, then the first computer 110 can predict a path of the movable object 140 based on, e.g., physical characteristics of the movable object 140 (such as an activated turn signal, turned vehicle wheels, activated backup lights, a direction of travel, etc.). The first computer 110 can then compare the predicted path of the movable object 140 to the planned path P of the host vehicle 105 to determine whether the predicted path of the movable object 140 will intersect the planned path P of the host vehicle 105.

The first computer 110 can be programmed to actuate one or more host vehicle components 125 based on the prediction. In the case that the first computer 110 predicts the future location of the movable object will not intersect the planned path P, the first computer 110 can operate the host vehicle 105 along the planned path P. In the case that the first computer 110 predicts that the future location of the movable object 140 will intersect the planned path P, the first computer 110 can actuate one or more host vehicle components 125 to output a signal to move the movable object 140.

For example, the first computer 110 may actuate a propulsion component to move the host vehicle 105 along a selected portion (i.e., segment that is some but less than all) of the planned path P. In this example, the first computer 110 can select the portion of the planned path P based on a first distance between the host vehicle 105 and the movable object 140. The first distance may be a linear distance, a radial distance, or some other distance. For example, the first computer 110 can compare the first distance to a first distance threshold. The first distance threshold specifies a maximum distance between the host vehicle 105 and the movable object above which the first computer 110 can move the host vehicle 105. The first distance threshold may be determined based on, e.g., empirical testing to determine the minimum distance at which the first computer 110 can prevent the host vehicle 105 from impacting the movable object 140 (e.g., based on size of the host vehicle 105, speed of the host vehicle 105, type of movable object 140, etc.). For example, the first distance threshold may be greater when the movable object 140 is a pedestrian as compared to when the movable object 140 is a vehicle. The first distance threshold may be stored in the memory of the first computer 110.

In the case that the first distance is above the first distance threshold, the first computer 110 can determine that the selected portion of the planned path P is the path from the location of the host vehicle 105 to the location at which the first distance between the host vehicle 105 and the movable object 140 equals the first distance threshold. In the case that the first distance is equal to or less than the first distance threshold, the first computer 110 determines that the selected portion of the planned path P is a nudge. In this context, a "nudge" is a non-zero movement of the host vehicle 105 along the planned path P. The nudge may be determined by, e.g., empirical testing to determine a minimum amount of movement that indicates the host vehicle 105 is moving along the planned path P. The nudge may be specified by, e.g., a linear displacement of the host vehicle 105 or a rotational displacement of the vehicle wheels of the host vehicle 105. The nudge may be stored in the memory of the first computer 110.

Additionally, or alternatively, the first computer 110 can actuate a horn, exterior lights (e.g., to flash headlamps, to activate backup lights, etc.), etc. to output the signal. The first computer 110 can, for example, actuate different host vehicle components 125 after respective predetermined time periods. The predetermined time periods may be determined by, e.g., empirical testing to determine an amount of time for movable objects 140, such as a pedestrian or a vehicle, to detect and react to the signal. The time periods may be stored in the memory of the first computer 110.

Upon outputting the signal to move the movable object 140, the first computer 110 can determine whether the movable object 105 has moved, or changed paths, after an abort time. The abort time may be determined by, e.g., empirical testing indicating a minimum amount of time to determine the movable object 140 will not move. The first computer 110 can, for example, compare a location of the movable object 140, e.g., obtained via image data, to the planned path P of the host vehicle 105. In the case that the movable object 140 has moved and is not intersecting the planned path P, the first computer 110 can operate the host vehicle 105 along the planned path P. In the case that the movable object 140 has not moved, i.e., is intersecting the planned path P, the first computer 110 can update the planned path P, e.g., to search for available sub-areas 210, to move around the movable object 140, etc., for the host vehicle 105. The first computer 110 can then actuate one or more host vehicle components 125 to operate the host vehicle 105 along the updated planned path P.

The second computer 145 may be programmed to determine a second distance between the vehicle 140 and the host vehicle 105. For example, the second computer 145 can receive and analyze sensor data to determine the second distance between the vehicle 140 and the host vehicle 105. The second computer 145 can then compare the second distance to a second distance threshold. The second distance threshold specifies a maximum distance within which the vehicle 140 may be judged to be obstructing movement of the host vehicle 105 along the planned path P. The second distance threshold may be determined by, e.g., empirical testing that indicates the minimum distance between the vehicle 140 and the host vehicle 105 such that the host vehicle 105 can maneuver around the vehicle 140. The second distance threshold may be stored, e.g., in the second memory of the second computer 145.

The second computer 145 may be programmed to determine a speed of the host vehicle 105. For example, the second computer 145 can receive and analyze sensor data to determine a change in the second distance between the host vehicle 105 and the vehicle 140 during a specified time. The second computer 145 can then compare the speed of the host vehicle 105 to a speed threshold. The speed threshold specifies a maximum speed below which the host vehicle 105 can be judged as stopped. The speed threshold may be determined by, e.g., empirical testing to determine a minimum speed at which vehicles typically operate around each other in an area 200. The speed threshold may be stored, e.g., in the second memory of the second computer 145.

The second computer 145 may be programmed to determine a width of a path around the vehicle 140. The width of the path around the vehicle is a distance from a side of the vehicle 140 to the detected objects. The second computer 145 can, for example, receive and analyze sensor data to detect objects laterally spaced from the vehicle 140. The second computer 145 can then determine the width of the path around the vehicle 140. For example, the second computer 145 can employ free space computation techniques to image data that identifies a range of pixel coordinates associated with and an object laterally spaced from the vehicle 140 and free space (i.e., space in which no object is detected) between the vehicle 140 and the object. By identifying a set of pixel coordinates in an image associated with the free space and the object and determining a distance (in pixel coordinates) from an image sensor lens, e.g., across the free space, to the identified object pixel coordinates, the second computer 145 can then determine a distance, e.g., across the free space, of an image sensor lens from the object. That is, according to conventional techniques, the second computer 145 can determine a distance from the lens to the identified coordinates (in pixel coordinates) and can further determine, from the image, an angle between a line from the sensor lens to the identified object and an axis extending from the lens parallel to a lateral axis of the vehicle 140. Then, using trigonometric functions, the second computer 145 can determine a length of a line drawn along the vehicle 140 lateral axis from the sensor 115 lens to a point on the object. The width of the path may be determined from the length of the line drawn along the vehicle 140 lateral axis.

As another example, the second computer 145 can generate a radar tracklet, i.e., a partial trajectory, of an object based on radar sensor 115 data about the object received during a time period. The second computer 145 can then predict a location of the object from the radar tracklet relative to the vehicle 140. By identifying a predicted location of the object relative to the vehicle 140, the second computer 145 can determine a distance of the image sensor lens from the object. That is, according to conventional techniques, the second computer 145 can determine a distance from the sensor lens to the predicted location and can further determine, from the image, an angle between a line from the sensor lens to the predicted location and an axis extending from the lens parallel to the vehicle 140 lateral axis. Then, using trigonometric functions, the second computer 145 can determine the width of the path, as discussed above.

The second computer 145 can then compare the width to a width threshold. The width threshold specifies a minimum distance between the vehicle 140 and an object such that the host vehicle 105 can operate between the vehicle 140 and the object. The width threshold may be equal to the width of the host vehicle 105. In such an example, the second computer 145 can determine the width of the host vehicle 105 based on image data, e.g., pixels used to depict the host vehicle 105. As another example, the width threshold may be determined by a rule specifying a maximum width of a vehicle that can operate in the area 200 and/or on a roadway. In such an example, the width threshold may be stored in the second memory of the second computer 145.

The second computer 145 may be programmed to predict the future location of the vehicle 140. The future location can be the same as or different than a current location of the vehicle 140. For example, in the case that the vehicle 140 is parked, or in an "off" state, the second computer 145 can predict the future location is a current location of the vehicle 140. As another example, the future location can be defined, at least in part, by a predicted path of the vehicle 140. That is, the second computer 145 can predict one or more future locations of the vehicle 140 (e.g., determined at different points in time) based on a predicted path of the vehicle 140.

The second computer 145 may be programmed to determine whether the future location of the vehicle 140 is in a travel route. As used herein, a "travel route" specifies an area of the ground surface designated for vehicle movement in the area 200, e.g., aisles between sub-areas 210. The second computer 145 can, for example, identify a travel route based on sensor data. In such an example, the second computer 145 can detect one or more indicators of a travel route, e.g., via image data. The indicators can include signs, markings on the ground surface, movement of vehicles along the route, etc. As another example, the second computer 145 can identify a travel route based on map data of the area 200 (e.g., stored in the second memory or received from a remote computer). The second computer 145 can then compare the future location of the vehicle 140 to the travel route. For example, the second computer 145 can compare location data of the future location to a travel route indicated in the map data of the area 200. As another example, the second computer 145 can detect an indicator at the future location based on sensor data, e.g., image data of the future location.

The second computer 145 may be programmed to predict that the host vehicle 105 will move along the planned path P. For example, the second computer 145 can receive and analyze sensor data to detect a signal from the host vehicle 105, e.g., actuation of one or more host vehicle components 125 such as activation of headlamps or backup lights, activation of a horn, movement of the host vehicle 105 along a portion of the planned path P, doors opened etc., from the host vehicle 105. The second computer 145 can, for example, predict the planned path P of the host vehicle 105 based on physical characteristics of the host vehicle 105 (e.g., turned vehicle wheels, a direction of travel, etc.). Alternatively, the host vehicle 105 can transmit the planned path P to the second computer 145, e.g., through V2V wireless communications (cellular and/or DSRC, etc.). If the second computer 145 detects the signal from the host vehicle 105, the second computer 145 predicts that the host vehicle 105 will move along the planned path P. If the second computer 145 does not detect the signal from the host vehicle 105, the second computer 145 can predict that the host vehicle 105 will not move along the planned path P.

The second computer 145 can determine an updated predicted future location for the vehicle 140. For example, the second computer 145 determines the updated predicted future location based on a third distance. The third distance is a maximum distance that the vehicle 140 can move from the future location to the updated predicted future location. The third distance may be stored in the second memory of the second computer 145. The third distance may be determined, e.g., based on the third distance being equal to a distance to the closest available sub-area 210 to the vehicle 140. Additionally, the second computer 145 can determine the updated predicted future location based further on determining that the updated predicted future location will avoid intersecting the planned path P of the host vehicle 105. For example, upon determining the planned path P of the host vehicle 105, the second computer 145 can compare the updated predicted future location to the planned path P of the host vehicle 105. If the updated predicted future location intersects the planned path P, then the updated predicted future location is invalid. If the updated future location does not intersect the planned path P, then the updated future location is valid.

The second computer 145 may be programmed to determine the host vehicle 105 has moved, i.e., is not obstructed by the vehicle 140, after a move time based on sensor data. The move time may be determined, e.g., by empirical testing indicating a maximum amount of time to determine the host vehicle 105 will not move. The second computer 145 can, for example, detect the host vehicle 105 moved around the vehicle 140 within the abort time. As another example, the second computer 145 can detect the host vehicle 105 moving in an opposite direction, i.e., away from the vehicle 140, within the abort time. In the case that the host vehicle 105 has moved, the second computer 145 can actuate one or more vehicle components to operate the vehicle 140 to the future location. In the case that the host vehicle 105 has not moved, the second computer 145 can actuate one or more vehicle components to operate the vehicle 140 to the updated future location.

The second computer 145 may be programmed to count a number of occurrences of the vehicle 140 moving to an updated future position. The second computer 145 can store the number of occurrences, e.g., in the second memory. The second computer 145 can then compare the number of occurrences to a threshold number. The threshold number specifies a maximum number of instances the vehicle 140 can be moved to an updated future position. The threshold number may be determined by, e.g., empirical testing to determine the vehicle 140 is impeding traffic. The threshold number may be an integer greater than 0. The threshold number may be stored in the second memory of the second computer 145.

The second computer 145 may be programmed to move the vehicle 140 to a sub-area 210, e.g., a parking space. For example, in the case that the second computer 145 cannot determine a valid updated future location, the second computer 145 can operate the vehicle 140 to a sub-area 210. As another example, the second computer 145 can operate the vehicle 140 to a sub-area 210 based on moving the vehicle 140 to the threshold number of updated future locations. In these circumstances, the second computer 145 can actuate one or more vehicle components to move the vehicle 140 to the parking space.

Figure 4:
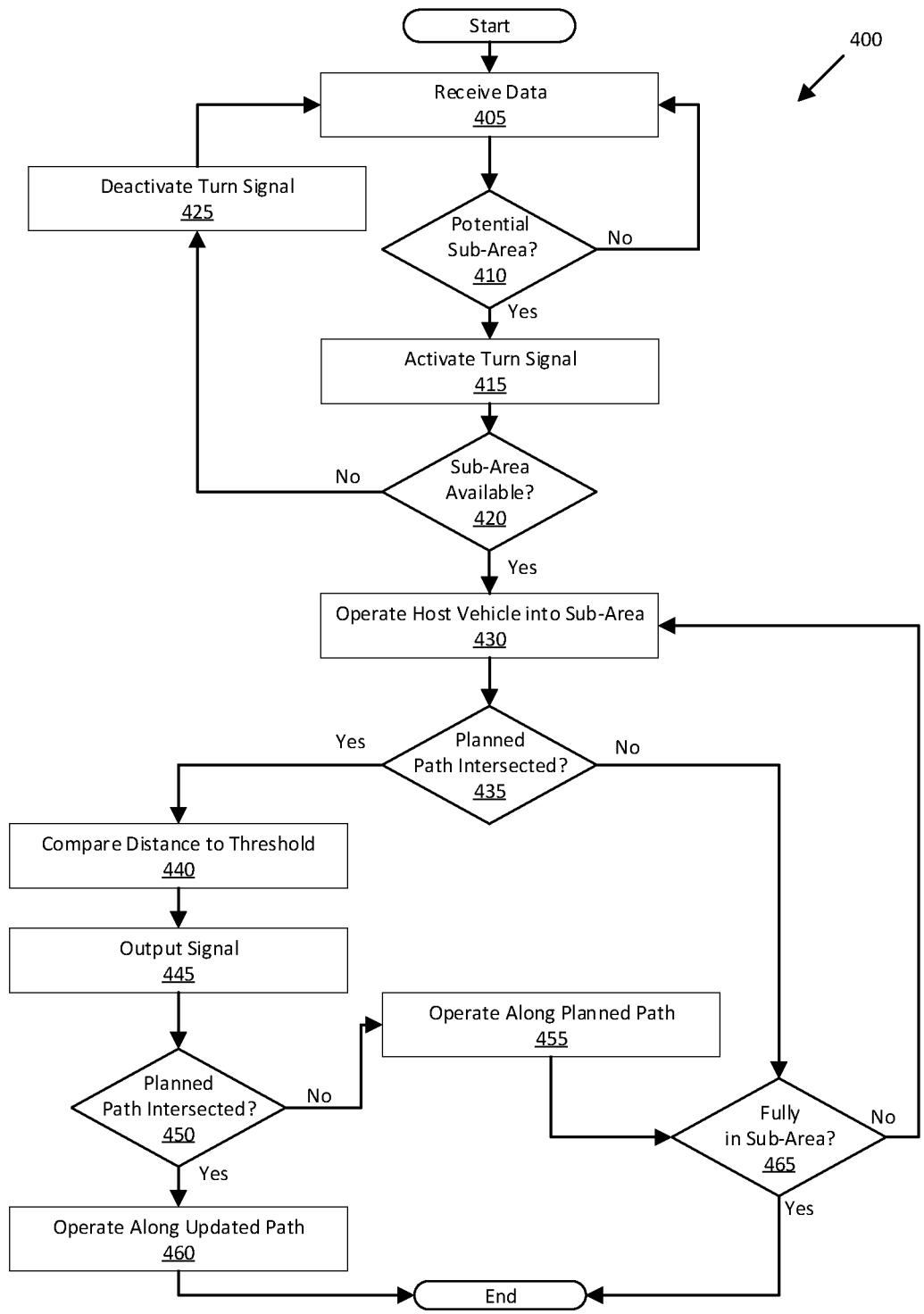
FIG. 4 is a flowchart of an example process for operating the host vehicle.

FIG. 4 is a diagram of an example process 400 for operating a host vehicle 105 in an area 200. The process 400 begins in a block 405.

In the block 405, the first computer 110 receives sensor 115 data, e.g., image data, from one or more sensors 115, e.g., via the vehicle network, while the host vehicle 105 is operating in the area 200 (e.g., to search for a sub-area 210 such as a parking space). The image data includes the environment around the host vehicle 105, e.g., the area 200, one or more sub-areas 210, one or more movable objects 140, one or more stationary objects, etc. The process 400 continues in a block 410.

In the block 410, the first computer 110 identifies a potentially available sub-area 210 based on the image data. For example, the first computer 110 can identify the sub-area 210 using conventional image recognition techniques, as discussed above. If the first computer 110 identifies a potentially available sub-area 210, e.g., a parking space, the process 400 continues in a block 415. Otherwise, the process 400 continues in the block 405.

In the block 415, the first computer 110 activates a turn signal. Specifically, the first computer 110 activates the turn signal on the same side of the host vehicle 105 as the sub-area 210, e.g., to indicate the host vehicle 105 may park in the sub-area 210. Additionally, the first computer 110 determines a planned path P to operate the host vehicle 105 to the sub-area 210, e.g., via a conventional navigation and/or path planning algorithm that receives a destination, e.g., a point in the sub-area 210, and uses map and/or sensor 115 data for an area such as the area 200. For example, the first computer 110 can determine to pull the host vehicle 105 forward into the sub-area 210 or back the host vehicle 105 into the sub-area 210, as discussed above. The process 400 continues in a block 420.

In the block 420, the first computer 110 determines whether the sub-area 210 is available based on sensor 115 data, e.g., image data, received while the host vehicle 105 is maneuvering into the sub-area 210. For example, in the case that the first computer 110 determines to back the host vehicle 105 into the sub-area 210 (as discussed above), the first computer 110 can receive sensor 115 data while the host vehicle 105 moves past the sub-area 210 to a stop position (as discussed above). As another example, the first computer 110 can receive sensor 115 data while the host vehicle 105 moves forward into the sub-area 210. The first computer 110 can analyze image data, e.g., using conventional image analysis or pattern recognition techniques, to identify a stationary object in the sub-area 210, e.g., between markings of a parking space.

Additionally, the first computer 110 can determine whether the host vehicle 105 is prohibited from accessing the sub-area 210. For example, the first computer 110 can determine access is prohibited based on detecting a condition or conditions specified to prohibit access to the sub-area 210, e.g., signs, markings, barriers, etc., via the image data. The first computer 110 can then compare host vehicle 105 data to the prohibition condition(s) to determine whether the host vehicle 105 is prohibited from accessing the sub-area 210. If the host vehicle 105 is not prohibited from accessing the sub-area 210 and the first computer 110 determines the sub-area 210 is free of stationary objects, the first computer 110 determines the sub-area 210 is available. If the host vehicle 105 is prohibited from accessing the sub-area 210 or the first computer 110 identifies a stationary object in the sub-area 210, the first computer determines the sub-area 210 is unavailable. In the case that the sub-area 210 is available, the process 400 continues in a block 430. Otherwise, the process 400 continues in a block 425.

In the block 425, the first computer 110 deactivates the turn signal, e.g., to indicate the host vehicle 105 will not park in the sub-area 210. The first computer 110 then operates the host vehicle 105 through the area 200, e.g., to continue searching for an available sub-area 210. For example, the first computer 110 can actuate one or more host vehicle components 125 to move the host vehicle 105, e.g., according to conventional techniques for autonomous or semi-autonomous operation, along the planned path P to search the area 200. The process 400 returns to the block 405.

In the block 430, the first computer 110 operates the host vehicle 105 along the planned path P into the sub-area 210. That is, the first computer 110 actuates one or more host vehicle 105 components 125, e.g., a steering component, a propulsion component, etc., to move the host vehicle 105 along the planned path P. As the host vehicle 105 moves along the planned path P, the first computer 110 receives sensor 115 data, e.g., image data, from sensors 115 facing along the planned path P. The process 400 continues in a block 435.

In the block 435, the first computer 110 predicts whether a movable object 140 will intersect a planned path P of the host vehicle 10. For example, the first computer 110 can identify and determine a trajectory (i.e., a path and speed(s) along the path) for a movable object 140 based on the sensor 115 data received in the block 430, e.g., lidar data, radar data, and/or visual image data, etc. The first computer 110 can then predict whether a future location of the movable object 140 will intersect the planned path P of the host vehicle 105. For example, in the case that the movable object 140 is moving, the first computer 110 can predict a path of the moving object 140 based on identifying a direction of movement of the movable object 140 via sensor 115 data, e.g., sequential frames of image data. The first computer 110 can then compare the predicted path of the movable object 140 to the planned path P of the host vehicle 105.

As another example, in the case that the movable object 140 is stationary, the first computer 110 can predict whether the movable object 140 will remain stationary or move based on physical characteristics of the movable object 140, as discussed above. If the first computer 110 predicts the movable object 140 will move, the first computer 110 can then compare the future location to the planned path P of the host vehicle 105. If the first computer 110 predicts the movable object 140 will remain stationary, the first computer 110 can then compare a current location of the movable object 140 to the planned path P. If the predicted future location of the movable object 140 intersects the planned path P of the host vehicle 105, the process 400 continues in a block 440. Otherwise, the process 400 continues in a block 465.

In the block 440, the first computer 110 compares a first distance between the movable object 140 and the host vehicle 105 to a first distance threshold. For example, the first computer 110 determines the first distance between the movable object 140 and the host vehicle 105 via image data, e.g., using various image processing techniques. The process 400 continues in a block 445.

In the block 445, the first computer 110 actuates one or more host vehicle components 125 to output a signal to move the movable object 140. For example, the first computer 110 can actuate a propulsion component and a steering component to operate the host vehicle 105 along a selected portion of the planned path P, as described above. The first computer 110 can determine the portion of the planned path P based on the first distance. If the first distance is greater than the first distance threshold, the first computer 110 selects the portion of the planned path P as a segment of the path P from the current location of the host vehicle 105 to the location at which the first distance between the host vehicle 105 and the movable object 140 equals the first distance threshold. If the first distance is equal to or less than the first distance threshold, the first computer 110 determines the portion of the planned path P is a nudge (as described above).

Additionally, the first computer 110 can actuate exterior lights (e.g., flashing headlamps, activating backup lights, etc.) a horn, and other suitable host vehicle components 125. The first computer 110 can, for example, actuate different host vehicle components 125 after predetermined time periods, as discussed above. The process 400 continues in a block 450.

In the block 450, the first computer 110 determines whether the movable object 140 is intersecting the planned path P. For example, the first computer 110 can detect that the movable object 140 has moved, or changed paths, after an abort time (as discussed above). For example, the first computer 110 can compare a location of the movable object 140, e.g., obtained via image data, to the planned path P of the host vehicle 105. In the case that movable object 140 has moved and is not intersecting the planned path P, the process 400 continues in a block 455. In the case that movable object 140 has not moved, i.e., is intersecting the planned path P, the process 400 continues in a block 460.

In the block 455, the first computer 110 operates the host vehicle 105 along the planned path P into the sub-area 210, e.g., a parking space. For example, the first computer 110 actuates one or more host vehicle components 125, e.g., a steering component and/or a propulsion component, to move the host vehicle 105 along the planned path P. The process 400 continues in a block 465.

In the block 460, the first computer 110 determines an updated planned path, e.g., using conventional navigation and/or path planning algorithms. For example, the first computer 110 can determine an updated planned path to move the host vehicle 105 out of the sub-area 210 and to continue searching the area 200 for an available sub-area 210. The first computer 110 can then operate the host vehicle 105 along the updated planned path. For example, the first computer 110 actuates one or more host vehicle components 125, e.g., a steering component and/or a propulsion component, to move the host vehicle 105 along the updated planned path, e.g., according to conventional techniques for autonomous or semi-autonomous operation. The process 400 ends following the block 460.

In the block 465, the first computer 110 determines whether the host vehicle 105 is fully in the sub-area 210. The host vehicle 105 is fully in the sub-area 210 when the entire host vehicle 105 is within a boundary of the sub-area 210, e.g., between conventional markings of a parking space. For example, the first computer 110 compares a location of the host vehicle 105, e.g., based on image data, GPS data, etc., to the sub-area 210. As another example, the first computer 110 can analyze sensor 115 data, e.g., image data, to determine the host vehicle 105 is approximately centered laterally and longitudinally relative to the sub-area 210, e.g., based on conventional markings indicating a parking space. Upon determining the host vehicle 105 is fully in the sub-area 210, the first computer 110 can actuate one or more host vehicle components 125, e.g., to stop or park the host vehicle 105 in the sub-area 210. In the case that the host vehicle 105 is fully in the sub-area 210, the process 400 ends. Otherwise, the process 400 continues in the block 430.

Figure 5:
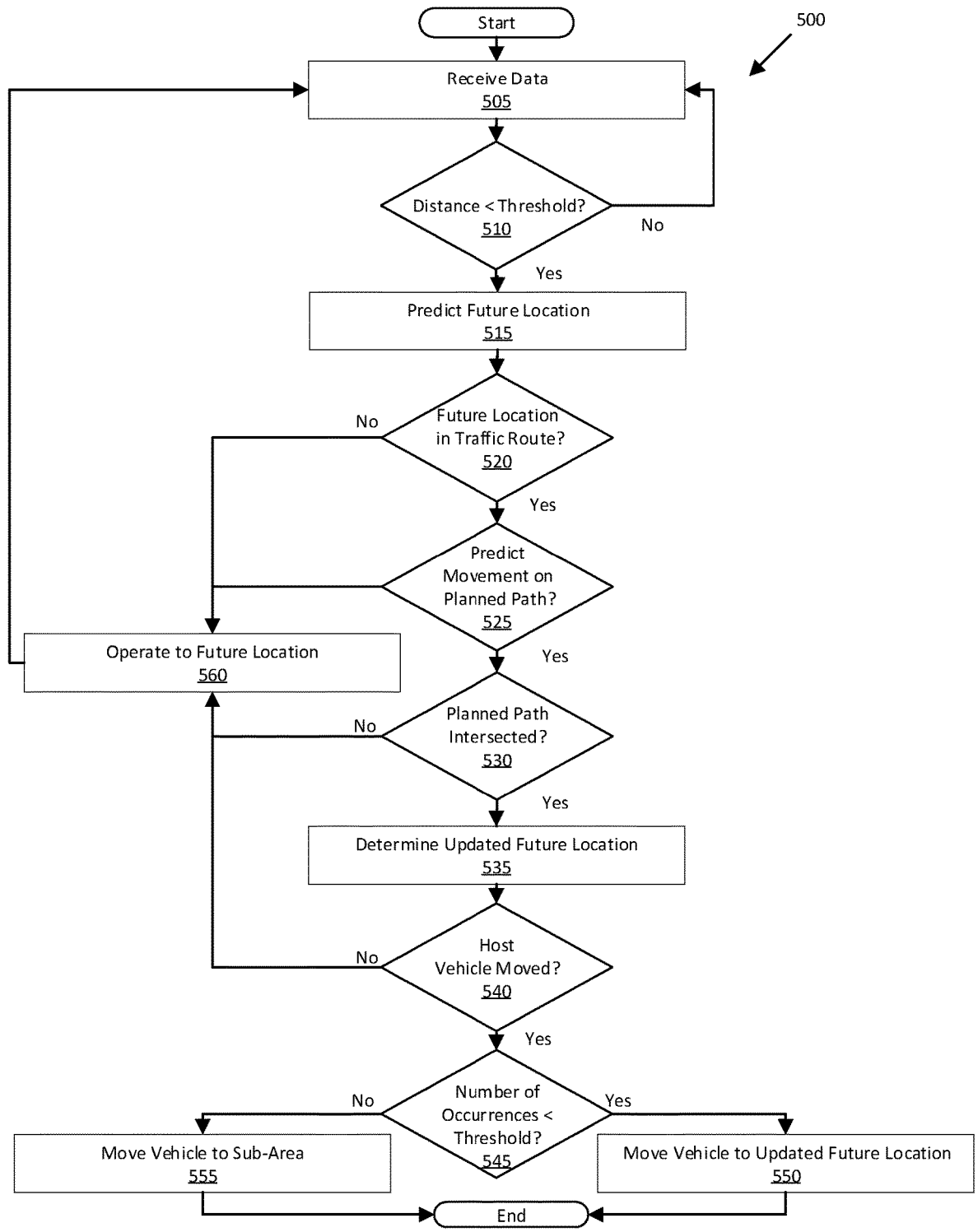
FIG. 5 is a flowchart of an example process for operating the movable object.

FIG. 5 is a diagram of an example process 500 for operating a movable object 140, in this example a vehicle 140 including a second computer 145, in the area 200. The process 500 beings in a block 505.

In the block 505, the second computer 145 receives image data from one or more image sensors 115, e.g., camera(s), while the vehicle 140 is in the area 200. The image data includes the environment around the vehicle 140, e.g., the area 200, one or more sub-areas 210, other vehicles including the host vehicle 105, etc. The process 500 continues in a block 510.

In the block 510, the second computer 145 determines whether a second distance from the host vehicle 105 to the vehicle 140 is within a second distance threshold (as described above). For example, the second computer 145 can identify the host vehicle 105 approaching the vehicle 140, e.g., based on lidar data, radar data, and/or visual image data, etc. The second computer 145 can then determine the second distance between the vehicle 140 and the host vehicle 105 via image data, e.g., using various image processing techniques. The second computer 145 can then compare the second distance to the second threshold.

Additionally, the second computer 145 can determine whether the host vehicle 105 is moving at a speed within a speed threshold (as described above). For example, the second computer 145 can determine the speed of the host vehicle 105 based on image data. In such an example, the second computer 145 can determine a change in the second distance between the vehicle 140 and the host vehicle 105 during a time period (e.g., as determined by sequential frames of image data). In the case that the second distance from host vehicle 105 to the vehicle 140 is within the threshold and the host vehicle 105 is operating at a speed within the speed threshold, the process 500 continues in a block 515. Otherwise, the process 500 returns to the block 505.

In the block 515, the second computer 145 predicts a future location of the vehicle 140. For example, in the case that the vehicle 140 is parked or in an "off" state, the second computer 145 can determine the future location is the current location of the vehicle 140. As another example, the future location can be defined, at least in part, by a predicted path of the vehicle 140. That is, the second computer 145 can predict one or more future locations of the vehicle 140 (e.g., determined at different points in time) based on analyzing a predicted path of the vehicle 140. The process 500 continues in a block 520.

In the block 520, the second computer 145 determines whether the predicted future location of the vehicle 140 is in a travel route (as described above). The second computer 145 can, for example, identify a travel route based on sensor data, as discussed above. As another example, the second computer 145 can identify a travel route based on map data of the area 200, e.g., stored in the second memory or received from a remote computer. The second computer 145 can then compare the predicted future location of the vehicle 140 to the travel route. In the case that the future location is in a travel route, the process 500 continues in a block 525. Otherwise, the process 500 continues in a block 560.

In the block 525, the second computer 145 predicts whether the host vehicle 105 will move along a planned path P. The second computer 145 can predict the planned path P of the host vehicle 105 based on physical characteristics of the host vehicle 105 (e.g., turned vehicle wheels, a direction travel, etc.) detected via image data. As another example, the second computer 145 can receive the planned path P from the host vehicle 105, e.g., via V2V communication.

Additionally, the second computer 145 can, for example, receive and analyze sensor data to detect the signal to move the vehicle 140, e.g., activation of headlamps or backup lights, activation of a horn, movement of the host vehicle 105 along a portion of the planned path P, closed doors, etc., from the host vehicle 105. If the second computer 145 detects the signal from the host vehicle 105, the second computer 145 predicts that the host vehicle 105 will move along the planned path P, and the process 500 continues in a block 530. If the second computer 145 does not detect the signal from the host vehicle 105, the second computer 145 can predict that the host vehicle 105 will not move, and the process 500 continues in a block 560.

In the block 530, the second computer 145 predicts whether the future location of the vehicle 140 will intersect a planned path P of the host vehicle 105. For example, the second computer 145 can compare the planned path P to the predicted future location of the vehicle 140. Additionally, the second computer 145 can determine a width of a path around the vehicle 140 based on image data, e.g., using image processing techniques. The second computer 145 can then compare the width to a width threshold. If the width is equal to or greater than the width threshold, the second computer 145 predicts the predicted future location will not intersect the planned path P of the host vehicle 105. If the width is less than the width threshold, the second computer 145 predicts that the predicted future location will intersect the planned path P of the host vehicle 105. In the case that the second computer 145 predicts that the predicted future location will intersect the planned path P of the host vehicle 105, the process 500 continues in a block 535. Otherwise, the process 500 ends.

In the block 535, the second computer 145 determines an updated predicted future location for the vehicle 140. For example, the second computer 145 determines the updated predicted future location based on a third distance (as discussed above). The second computer 145 then compares the third distance to a third distance threshold. If the third distance is less than or equal to the third distance threshold, then the second computer 145 determines the updated predicted future location is valid. If the third distance is greater than the third distance threshold, then the second computer 145 determines the updated predicted future location is invalid.

Additionally, the second computer 145 determines the updated predicted future location based on determining that the updated predicted future location will avoid intersecting the planned path P of the host vehicle 105. For example, the second computer 145 can compare the updated predicted future location to the planned path P of the host vehicle 105. Additionally, the second computer 145 can determine a width of the path around the vehicle 140 at the updated predicted future location and compare the width to the width threshold. If the updated predicted future location intersects the planned path P, then the second computer 145 determines the updated predicted future location is invalid. If the updated future location does not intersect the planned path P, then the second computer 145 determines the updated predicted future location is valid. The process 500 continues in a block 540.

In the block 540, the second computer 145 determines whether the host vehicle 105 moved such that the predicted future location of the vehicle 140 does not intersect the planned path P of the host vehicle 105. For example, the second computer 145 can detect that the host vehicle 105 has moved, or changed paths, within an abort time based on sensor data, e.g., image data, indicating a location of the host vehicle 105. Alternatively, the second computer 145 can detect that the host vehicle 105 has not moved within the abort time based on sensor data. In the case that the host vehicle 105 has not moved, the process 500 continues in a block 545. Otherwise, the process 500 continues in the block 560.

In the block 545, the second computer 145 determines whether the number of occurrences of the vehicle 140 moving to an updated future location is less than a threshold number (as discussed above). For example, the second computer 145 can compare the number of occurrences to the threshold number. If the number of occurrences is less than the threshold number, then the process 500 continues in a block 550. Otherwise, the process 500 continues in a block 555.

In the block 550, the second computer 145 moves the vehicle 140. For example, the second computer 145 can actuate one or more vehicle components to move the vehicle 140 to the updated future location. The process 500 ends following the block 550.

In the block 555, the second computer 145 moves the vehicle 140. For example, the second computer 145 can actuate one or more vehicle components to move the vehicle 140, e.g., according to conventional techniques for autonomous or semi-autonomous operation, to a sub-area 210, e.g., a parking space. The process 500 ends following the block 555.

In the block 560, the second computer 145 operates the vehicle 140 to the future location, e.g., according to conventional techniques for autonomous or semi-autonomous operation. For example, the second computer 145 can actuate one or more vehicle components 125 to move the vehicle 140 to the future location, e.g., when the vehicle 140 is moving along a path. As another example, the second computer 145 can maintain the vehicle 140 at a current location, e.g., when the vehicle 140 is stationary. The process 500 returns to the block 505 following the block 560.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A system, comprising:
a first computer for a host vehicle and including a processor and a memory, the memory storing first instructions executable by the processor to:
predict that a future location of a movable object in an area, and a planned path of the host vehicle from a first location to a sub-area defined within the area, will intersect;
actuate the host vehicle component to output a signal indicating to move the movable object;
upon determining a first distance along the planned path from the host vehicle to the movable object is less than or equal to a threshold distance, actuate the propulsion component to operate the host vehicle along a portion of the planned path, wherein the portion is a nudge;
then, at least one of (a) determine that the movable object has moved, or (b) update the planned path of the host vehicle; and
then, operate the host vehicle along the planned path or the updated planned path; and
a second computer for the movable object, the second computer including a second processor and a second memory, the second memory storing second instructions executable by the second processor to:
predict that the host vehicle will move along the planned path;
then, upon determining that the future location of the movable object is in a travel route designated in the area, at least one of (a) determine that the host vehicle has moved along the updated path or (b) update the future location of the movable object; and
then, operate the movable object to the future location or the updated future location.

2. The system of claim 1, wherein the second instructions further include instructions to determine the future location of the movable object is in the travel route based on at least one of sensor data and location data.

3. The system of claim 1, wherein the second instructions further include instructions to determine the updated future location will avoid intersecting the planned path.

4. The system of claim 1, wherein the second instructions further include instructions to determine the updated future location based on a distance from the future location to the updated future location being within a specified distance.

5. The system of claim 1, wherein the movable object is a vehicle.

6. The system of claim 5, wherein the second instructions further include instructions to operate the movable object to a parking space based on moving the movable object to a threshold number of updated future locations.

7. The system of claim 1, wherein the first instructions further include instructions to input host vehicle sensor data into a machine learning program that identifies the movable object.

8. The system of claim 1, wherein the future location is defined in part by a path of the movable object.

9. The system of claim 1, wherein the first instructions further include instructions to determine at least one of the movable object and the host vehicle is moving at a speed below a speed threshold.

10. The system of claim 1, wherein the first instructions further include instructions to, upon identifying a parking space for the host vehicle, actuate a turn signal of the host vehicle.

11. The system of claim 1, wherein the first instructions further include instructions to, upon determining a planned path into a parking space, perform a parking maneuver along the planned path.

12. The system of claim 1, wherein the movable object is one of a vehicle or a pedestrian.

13. A method comprising:
in a host vehicle, predicting that a future location of a movable object and a planned path of the host vehicle will intersect;
actuating the host vehicle component to output a signal indicating to move the movable object, wherein the host vehicle component is at least one of a horn, exterior lights, or a propulsion component;
upon determining a distance along the planned path from the host vehicle to the movable object is less than or equal to a threshold distance, actuating the propulsion component to operate the host vehicle along a portion of the planned path, wherein the portion is a nudge;
then, at least one of (a) determining that the movable object has moved, or (b) updating the planned path of the host vehicle;
then, operating the host vehicle along the planned path or the updated planned path; and
in the movable object, predicting that the host vehicle will move along the planned path;
then, upon determining that the future location of the movable object is in a travel route designated in the area, at least one of (a) determining that the host vehicle has moved along the updated path or (b) updating the future location of the movable object; and
then, operating the movable object to the future location or the updated future location.

14. The method of claim 13, wherein the movable object is one of a vehicle or a pedestrian.

15. The system of claim 1, wherein the second instructions further include instructions to predict that the future location will not intersect the planned path based on a width of a path around the moveable object being greater than a width threshold.

16. The system of claim 1, wherein the second instructions further include instructions to predict the future location based on detecting (a) the host vehicle is within a second threshold distance of the moveable object, and (b) the host vehicle speed is less than a speed threshold.

17. The system of claim 1, wherein the host vehicle component is at least one of a horn, exterior lights, or a propulsion component.

* * * * *